United States Patent
Sukhotskiy et al.

(10) Patent No.: US 11,839,916 B2
(45) Date of Patent: Dec. 12, 2023

(54) DEVICE AND METHOD FOR CLEANING AN ORIFICE IN A METAL DROP EJECTING THREE-DIMENSIONAL (3D) METAL OBJECT

(71) Applicant: Xerox Corporation, Norwalk, CT (US)

(72) Inventors: Viktor Sukhotskiy, Livermore, CA (US); Joseph C. Sheflin, Macedon, NY (US); Brian M. Balthasar, North Tonawanda, NY (US); Peter Knausdorf, Henrietta, NY (US); Chu-Heng Liu, Penfield, NY (US)

(73) Assignee: Additive Technologies LLC, Palm City, FL (US)

( * ) Notice: Subject to any disclaimer, the term of this patent is extended or adjusted under 35 U.S.C. 154(b) by 0 days.

(21) Appl. No.: 17/648,490

(22) Filed: Jan. 20, 2022

(65) Prior Publication Data

US 2023/0226614 A1    Jul. 20, 2023

(51) Int. Cl.
  *B22F 12/53* (2021.01)
  *B08B 1/00* (2006.01)
  *B33Y 30/00* (2015.01)
  *B22F 10/30* (2021.01)
  *B33Y 40/00* (2020.01)
  *B33Y 10/00* (2015.01)

(52) U.S. Cl.
  CPC .............. *B22F 12/53* (2021.01); *B08B 1/008* (2013.01); *B22F 10/30* (2021.01); *B33Y 10/00* (2014.12); *B33Y 30/00* (2014.12); *B33Y 40/00* (2014.12)

(58) Field of Classification Search
  CPC .......... B22F 12/53; B22F 10/30; B08B 1/008; B33Y 10/00; B33Y 30/00; B33Y 40/00
  See application file for complete search history.

(56) References Cited

U.S. PATENT DOCUMENTS

| | | |
|---|---|---|
| 5,115,250 A * | 5/1992 | Harmon ............... B41J 2/16547 347/33 |
| 9,208,928 B2 | 12/2015 | Muramatsu |
| 2017/0297098 A1 | 10/2017 | Myerberg et al. |
| 2020/0324341 A1 | 10/2020 | Liu et al. |
| 2021/0379664 A1* | 12/2021 | Gibson .................... B08B 1/04 |
| 2022/0281162 A1* | 9/2022 | Liu .................... A61C 13/0022 |

FOREIGN PATENT DOCUMENTS

WO    2020/061544 A1    3/2020

* cited by examiner

*Primary Examiner* — Rebecca Janssen
(74) *Attorney, Agent, or Firm* — Maginot Moore & Beck LLP

(57) ABSTRACT

A three-dimensional (3D) metal object manufacturing apparatus is equipped with an orifice cleaning system that removes metal drops that have adhered to a plate, an orifice in the plate, and a nozzle ejecting melted metal drops through the orifice during object forming operations. The orifice cleaning system includes an orifice cleaning tool that consists essentially of a soft carbon material, such as graphite. The orifice cleaning tool is configured with a handle that is gripped by an articulated arm to move the orifice cleaning tool against the plate, the orifice, and a portion of the nozzle at the orifice.

8 Claims, 4 Drawing Sheets

DEVICE AND METHOD FOR CLEANING AN ORIFICE IN A METAL DROP EJECTING THREE-DIMENSIONAL (3D) METAL OBJECT

TECHNICAL FIELD

This disclosure is directed to three-dimensional (3D) metal object printers that eject melted metal drops to form objects and, more particularly, to the nozzles and orifices through which the melted metal drops are ejected in such printers.

BACKGROUND

Three-dimensional printing, also known as additive manufacturing, is a process of making a three-dimensional solid object from a digital model of virtually any shape. Many three-dimensional printing technologies use an additive process in which an additive manufacturing device forms successive layers of the part on top of previously deposited layers. Some of these technologies use ejectors that eject UV-curable materials, such as photopolymers or elastomers, while other technologies melt an elastomer and extrude the thermoplastic material into object layers. The printer typically operates one or more ejectors or extruders to form successive layers of plastic or thermoplastic material to construct a three-dimensional printed object with a variety of shapes and structures. After each layer of the three-dimensional printed object is formed, the plastic material is UV cured and hardens to bond the layer to an underlying layer of the three-dimensional printed object. This additive manufacturing method is distinguishable from traditional object-forming techniques, which mostly rely on the removal of material from a work piece by a subtractive process, such as cutting or drilling.

Recently, some 3D object printers have been developed that eject drops of melted metal from one or more ejectors to form 3D objects. These printers have a source of solid metal, such as a roll of wire or pellets, that feeds solid metal into a heated receptacle of a vessel in the printer where the solid metal is melted and the melted metal fills the receptacle. The receptacle is made of non-conductive material around which an electrical wire is wrapped to form a coil. An electrical current is passed through the coil to produce an electromagnetic field that causes the meniscus of the melted metal at a nozzle of the receptacle to separate from the melted metal within the receptacle and be propelled from the nozzle. A build platform is positioned to receive the ejected melted metal drops from the nozzle of the ejector and this platform is moved in a X-Y plane parallel to the plane of the platform by a controller operating actuators. These ejected metal drops form metal layers of an object on the platform and another actuator is operated by the controller to alter the distance between the ejector and the platform to maintain an appropriate distance between the ejector and the most recently printed layer of the metal object being formed. This type of metal drop ejecting printer is also known as a magnetohydrodynamic (MHD) printer.

In drop-on-demand (DOD) melted metal drop 3D object printing, the consistency of the velocity, size, and trajectory of the melted metal drops is critical for accurate formation of 3D metal objects. A stable stream of melted metal drops requires that the nozzle and the orifice in baseplate surrounding the orifice remains clean so ejected drops break cleanly from the melted metal within the nozzle and the circular shape of the orifice contributes to good drop formation. Additionally, the perimeter of the meniscus within the nozzle must remain stable. Any contamination at or near the nozzle or the orifice can interfere with melted metal drop formation and produce inconsistently shaped drops, off-axis drop trajectories, or drop satellites. In some cases, these drop satellites land near the nozzle and the orifice and result in marginal melted metal drop streams. The satellite drops that adhere near the nozzle and the orifice can also oxidate. Oxides at or near the meniscus perimeter can interfere with the motion of the meniscus surface during drop ejection and drop pinch-off.

Similar problems arise in inkjet printing where satellite drops from ejected ink drops can adhere to the printhead faceplate and cause problems with the ink meniscus in the nozzles, proper ink drop formation, and accurate ink drop trajectories. To address these issues in inkjet printing, the faceplates of the printheads are cleaned from time to time. This cleaning is typically achieved with a purge of the ink through the nozzles so the ink acts a solvent to loosen or partially dissolve the dried ink drop satellites. A flexible blade is then wiped across the faceplate to remove the purged ink and the debris in that ink. In order for the blade to perform well, it has to be in intimate contact with the faceplate during the whole wiping process. To achieve this goal, a soft blade material, such as rubber or other elastomer, is typically used.

A number of challenges arise in attempts to clean the nozzle and orifice of the ejector head in a MHD printer. For one, the high temperature environment is problematic. Melted metal drop ejecting 3D object printers eject melted metal drops at temperatures of 400° C. and higher. No elastomer, rubber, or plastic compound can endure these temperatures without suffering damage. Currently, a nozzle and orifice in a 3D metal object printer cannot be cleaned. Instead, the printer has to be completely shut down and cooled so the printer components can be disassembled, the nozzle replaced, and the baseplate abrasively cleaned. Then, the printer is reassembled and an initialization process is commenced to bring the printer up to its operational temperature of 875° C. so solid metal can be fed into the printer and melted to fill the vessel within the printer. Thus, significant printer operational time is lost. Also, when the melted metal satellite drops freeze around the nozzle and the orifice, they bond more tightly than liquid ink drops. Consequently, significant force would be required to dislodge the bonded metal drops from the nozzle and surrounding structure without damage to the orifice shape or the nozzle. Being able to remove bonded metal drops from a nozzle and orifice in a 3D metal object printer without requiring a complete initialization of the printer would be beneficial.

SUMMARY

A new method of operating a 3D metal object printer removes bonded metal drops from a nozzle and orifice in a 3D metal object printer without requiring a complete initialization of the printer. The method includes operating an ejector head to eject melted metal drops from a nozzle to form layers of a metal object being formed on a first planar member, and operating at least one actuator to move an orifice cleaning tool across a second planar member having an orifice through which the ejected melted metal drops pass before forming a layer of the metal object to remove metal drops that have adhered to the second planar member, the orifice, and the nozzle.

A new 3D metal object printer removes bonded metal drops from a nozzle and orifice in a 3D metal object printer without requiring a complete initialization of the printer. The new 3D metal object printer includes an ejector head having a nozzle from which melted metal drops are ejected, a first planar member toward which the melted metal drops are ejected, a second planar member positioned between the ejector head and the first planar member, the second planar member having an orifice through which the ejected melted metal drops pass, an orifice cleaning tool, and at least one actuator configured to move the orifice cleaning tool against the second planar member to remove metal drops that have adhered to the second planar member and the orifice.

A new orifice cleaning tool is configured to remove bonded metal drops from a nozzle and orifice in a 3D metal object printer without requiring a complete initialization of the printer. The new orifice cleaning tool includes a cleaning head and a handle operatively connected to the cleaning head.

BRIEF DESCRIPTION OF THE DRAWINGS

The foregoing aspects and other features of a method for operating a 3D metal object printer that removes bonded metal drops from a nozzle and orifice in a 3D metal object printer without requiring a complete initialization of the printer, a 3D metal object printer that implements the method, and a new orifice scraper are explained in the following description, taken in connection with the accompanying drawings.

DETAILED DESCRIPTION

Figure 1:
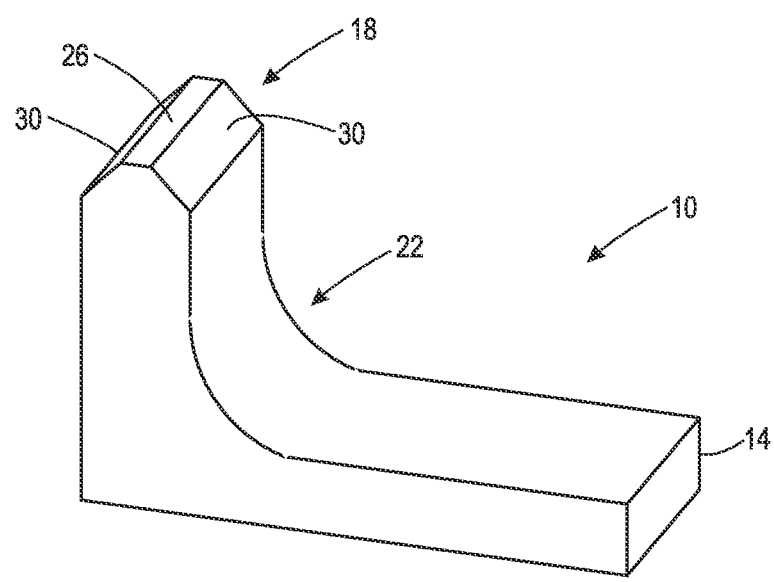
FIG. 1 depicts a new orifice scraper that is used in a 3D metal object printer to remove bonded metal drops from a nozzle and orifice without requiring a complete initialization of the printer.

For a general understanding of the environment for the 3D metal object printer and its operation as disclosed herein as well as the details for the printer and its operation, reference is made to the drawings. In the drawings, like reference numerals designate like elements.

Figure 4:
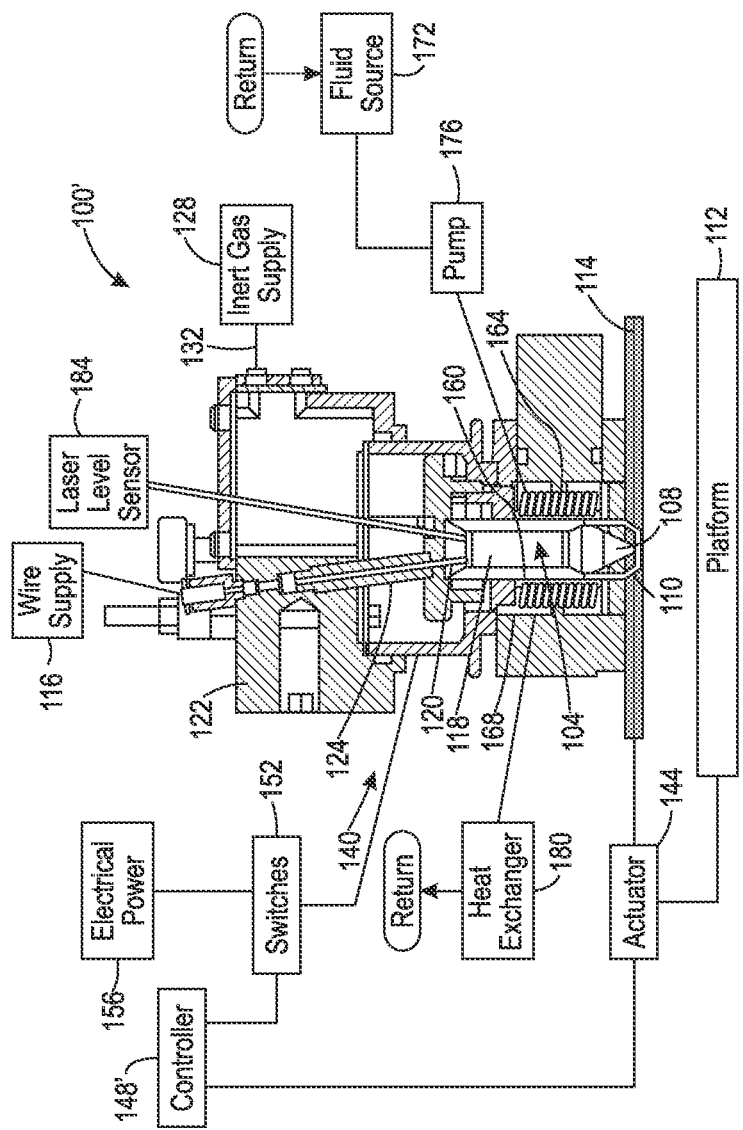
FIG. 4 is a schematic diagram of a prior art 3D metal printer that does not include a tool for cleaning the nozzle and orifice.

FIG. 4 illustrates an embodiment of a previously known 3D metal object printer 100 that ejects drops of a melted metal to form a metal object directly on a build platform. In the printer of FIG. 4, drops of melted bulk metal are ejected from a receptacle of a removable vessel 104 having a single nozzle 108 and drops from the nozzle form layers of an object on a build platform 112. As used in this document, the term "removable vessel" means a hollow container having a receptacle configured to hold a liquid or solid substance and the container as a whole is configured for installation and removal in a 3D metal object printer. As used in this document, the term "vessel" means a hollow container having a receptacle configured to hold a liquid or solid substance that may be configured for installation and removal from a 3D object metal printer. As used in this document, the term "bulk metal" means conductive metal available in aggregate form, such as wire of a commonly available gauge, pellets of macro-sized proportions, and metal powder.

With further reference to FIG. 4, a source of bulk metal 116, such as metal wire 120, is fed into a wire guide 124 that extends through the upper housing 122 in the ejector head 140 and melted in the receptacle of the removable vessel 104 to provide melted metal for ejection from the nozzle 108 through an orifice 110 in a baseplate 114 of the ejector head 140. As used in this document, the term "nozzle" means an orifice fluidically connected to a volume within a receptacle of a vessel containing melted metal that is configured for the expulsion of melted metal drops from the receptacle within the vessel. As used in this document, the term "orifice" means an opening in a plate through which melted metal drops are ejected from a nozzle. As used in this document, the term "ejector head" means the housing and components of a 3D metal object printer that melt, eject, and regulate the ejection of melted metal drops for the production of metal objects. A melted metal level sensor 184 includes a laser and a reflective sensor. The reflection of the laser off the melted metal level is detected by the reflective sensor, which generates a signal indicative of the distance to the melted metal level. The controller receives this signal and determines the level of the volume of melted metal in the removable vessel 104 so it can be maintained at an appropriate level 118 in the receptacle of the removable vessel. The removable vessel 104 slides into the heater 160 so the inside diameter of the heater contacts the removable vessel and can heat solid metal within the receptacle of the removable vessel to a temperature sufficient to melt the solid metal. As used in this document, the term "solid metal" means a metal as defined by the periodic chart of elements or alloys formed with these metals in solid rather than liquid or gaseous form. The heater is separated from the removable vessel to form a volume between the heater and the removable vessel 104.

With further reference to FIG. 4, an inert gas supply 128 provides a pressure regulated source of an inert gas, such as argon, to the ejector head through a gas supply tube 132. The gas flows through the volume between the heater and the removable vessel and exits the ejector head around the nozzle 108 and the orifice 110 in the baseplate 114. This flow of inert gas proximate to the nozzle insulates the ejected drops of melted metal from the ambient air at the baseplate 114 to prevent the formation of metal oxide during the flight of the ejected drops. A gap between the nozzle and the surface on which an ejected metal drop lands is intentionally kept small enough that the inert gas exiting around the nozzle does not dissipate before the drop within this inert gas flow lands.

The ejector head 140 is movably mounted within Z-axis tracks for movement of the ejector head with respect to the platform 112. One or more actuators 144 are operatively connected to the ejector head 140 to move the ejector head along a Z-axis and are operatively connected to the platform 112 to move the platform in an X-Y plane beneath the ejector head 140. The actuators 144 are operated by a controller 148 to maintain an appropriate distance between the orifice 110 in the baseplate 114 of the ejector head 140 and a surface of an object on the platform 112. The build platform in some versions of the system 100 consists essentially of oxidized steel, while in others the oxidized steel has an upper surface coating of tungsten or nickel. The oxidized steel version of the platform is not as likely to bond too strongly to the base layer of the melted aluminum since it is not readily wetted by melted aluminum. While this platform is advantageous for removal of the object after it is manufactured, it may not be adequately strong enough to support formation of the object during the entire process. To address this issue, other versions of the platform add tungsten or nickel surfaces to the platform to improve the wetting of the build surface with the melted aluminum.

Moving the platform 112 in the X-Y plane as drops of melted metal are ejected toward the platform 112 forms a swath of melted metal drops on the object being formed. Controller 148 also operates actuators 144 to adjust the distance between the ejector head 140 and the most recently formed layer on the substrate to facilitate formation of other structures on the object. While the melted metal 3D object printer 100 is depicted in FIG. 4 as being operated in a vertical orientation, other alternative orientations can be employed. Also, while the embodiment shown in FIG. 4 has a platform that moves in an X-Y plane and the ejector head moves along the Z axis, other arrangements are possible. For example, the actuators 144 can be configured to move the ejector head 140 in the X-Y plane and along the Z axis or they can be configured to move the platform 112 in both the X-Y plane and Z-axis.

A controller 148 operates the switches 152. One switch 152 can be selectively operated by the controller to provide electrical power from source 156 to the heater 160, while another switch 152 can be selectively operated by the controller to provide electrical power from another electrical source 156 to the coil 164 for generation of the electrical field that ejects a drop from the nozzle 108. Because the heater 160 generates a great deal of heat at high temperatures, the coil 164 is positioned within a chamber 168 formed by one (circular) or more walls (rectilinear shapes) of the ejector head 140. As used in this document, the term "chamber" means a volume contained within one or more walls within a metal drop ejecting printer in which a heater, a coil, and a removable vessel of a 3D metal object printer are located. The removable vessel 104 and the heater 160 are located within such a chamber. The chamber is fluidically connected to a fluid source 172 through a pump 176 and also fluidically connected to a heat exchanger 180. As used in this document, the term "fluid source" refers to a container of a liquid having properties useful for absorbing heat. The heat exchanger 180 is connected through a return to the fluid source 172. Fluid from the source 172 flows through the chamber to absorb heat from the coil 164 and the fluid carries the absorbed heat through the exchanger 180, where the heat is removed by known methods. The cooled fluid is returned to the fluid source 172 for further use in maintaining the temperature of the coil in an appropriate operational range.

The controller 148 of the 3D metal object printer 100 requires data from external sources to control the printer for metal object manufacture. In general, a three-dimensional model or other digital data model of the object to be formed is stored in a memory operatively connected to the controller 148. The controller can selectively access the digital data model through a server or the like, a remote database in which the digital data model is stored, or a computer-readable medium in which the digital data model is stored. This three-dimensional model or other digital data model is processed by a slicer implemented with the controller to generate machine-ready instructions for execution by the controller 148 in a known manner to operate the components of the printer 100 and form the metal object corresponding to the model. The generation of the machine-ready instructions can include the production of intermediate models, such as when a CAD model of the device is converted into an STL data model, a polygonal mesh, or other intermediate representation, which in turn can be processed to generate machine instructions, such as g-code, for fabrication of the object by the printer. As used in this document, the term "machine-ready instructions" means computer language commands that are executed by a computer, microprocessor, or controller to operate components of a 3D metal object additive manufacturing system to form metal objects on the platform 112. The controller 148 executes the machine-ready instructions to control the ejection of the melted metal drops from the nozzle 108, the positioning of the platform 112, as well as maintaining the distance between the orifice 110 in baseplate 114 and a surface of the object on the platform 112.

A new tool useful for cleaning metal satellite drops from the nozzle and orifice of a 3D metal object printer is shown in FIG. 1. The tool 10 includes a handle 14, a cleaning head 18, and a connecting section 22. The connecting section 22 is shown as a curved structure but other shapes can be used as well, such as a right angle rectangular elbow. The cleaning head 18 includes a cleaning face 26 that is joined to the connecting section 22 by two beveled faces 30. As described below, the handle 14 provides a grip for an articulating arm so the tool 10 can be used without requiring operator manual manipulation of the tool for orifice cleaning. Although the handle is depicted in FIG. 1 as being made of the same material as the cleaning head, it can be made of a different material. For example, the handle could be formed with stainless steel or another high temperature metal alloy. The cleaning face 26 is a planar surface that is rubbed in a reciprocating manner across the end of the orifice in a baseplate within a 3D metal object printer. In one embodiment, the tool 10 is made of a soft carbon material, such as graphite. As used in this document, the term "soft carbon material" means any material that conforms to the surface being cleaned so as to intimately contact the surface as the tool is moved across the surface. Such materials typically have a hardness factor in a range of about 60 to about 90 shore. Graphite can withstand temperatures of 1500° C. and higher without damage. Additionally, as the cleaning face 26 is rubbed across the orifice, the baseplate area surrounding the orifice, and a portion of the nozzle at the orifice, it conforms to the orifice and the plate about the orifice. The graphite is sufficiently rigid that it transfers enough force to the satellite drops that have bonded to the plate, the orifice, or the nozzle in the vicinity of the orifice. As graphite particles and removed satellite drops fall from the orifice, nozzle and plate, the beveled faces 30 direct this debris away from the orifice area. While tool 10 is described as being formed with graphite, other materials can be used such as boron nitride and the like. As used in this document, the term "orifice cleaning tool" means an implement configured to remove metal drops that have adhered to a metal plate, an orifice in the plate, and a nozzle ejecting melted metal drops through the orifice in a 3D object printer while the 3D object printer is in its operational mode, that is, within the high temperature environment of the printer while a 3D metal object is being formed.

In one embodiment, a length of the handle 14 is in a range of about 12-16 mm, while the width and height of the handle is about 4.5 mm by about 2.5 mm. The dimensions of the connecting section are about 3 mm by 9 mm and the cleaning face is about 0.50 by about 4.50 mm. The beveled faces 30 slope from the cleaning face at an angle in a range of about 40 to about 50 degrees and, in one embodiment, each face is about 1.75 mm by 4.50 mm. The handle 14 to tool surface 26 is illustrated as being at about a 90° angle, although other angles can be used.

Figure 2:
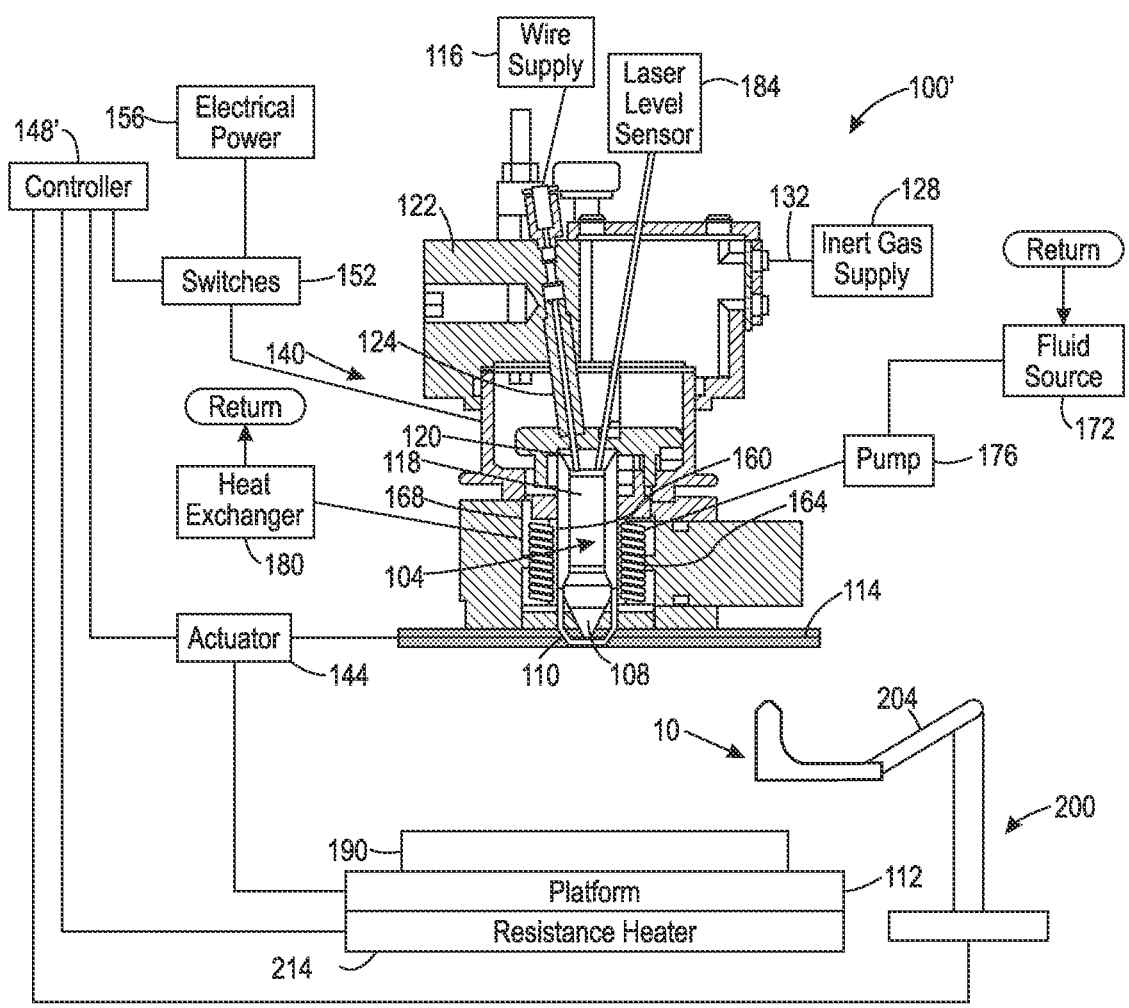
FIG. 2 is a new 3D metal object printer that includes an articulated arm that manipulates the tool of FIG. 1 to clean the nozzle and orifice of the printer.

Using like reference numbers for like components and removing some of the components not germane to orifice cleaning, a new 3D metal object printer 100' that is configured for orifice cleaning during printing operations is shown in FIG. 2. The printer 100' includes a orifice cleaning system 200 as well as a controller 148' configured with programmed instructions stored in a non-transitory memory connected to the controller. The controller 148' executes programmed instructions to operate the cleaning system 220 as described below to rub a cleaning tool across the orifice and a portion of the baseplate surrounding the orifice in the printer. The tool can be applied to the orifice and baseplate without having to cool the printer or its environment and without requiring disassembly of the printer or replacement of the nozzle. After the orifice, surrounding baseplate area, and nozzle have been cleaned with the tool, the printer can resume metal drop ejecting operations to complete manufacture of the object on the build platform.

Cleaning system 200 includes an articulated arm 204 that holds tool 10. As used in this document, the term "articulated arm" means a motive component configured to move with reference to the build platform of a 3D metal object printer. The articulated arm is operatively connected to the controller 148' so the controller can operate the arm to rub the tool 10 across the orifice 110 in baseplate 114 to remove metal satellite drops from the orifice and the surrounding baseplate. As used in this document, the term "rub" means a non-circular motion that presses the tool against the baseplate area surrounding the orifice and the portion of the nozzle at the orifice in a 3D metal object printer. The articulated arm is operated to apply pressure to the tool 10 to remove metal satellite drops from the orifice and surrounding baseplate area. The combination of the applied pressure and the shape of the tool cleaning face facilitates the removal of the metal satellite drops and restore the integrity of metal drop formation during printing. Once the orifice and surrounding area has been cleaned, manufacture of the metal object can continue.

The controller 148' can be implemented with one or more general or specialized programmable processors that execute programmed instructions. The instructions and data required to perform the programmed functions can be stored in memory associated with the processors or controllers. The processors, their memories, and interface circuitry configure the controllers to perform the operations previously described as well as those described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits. During metal object formation, image data for a structure to be produced are sent to the processor or processors for controller 148' from either a scanning system or an online or work station connection for processing and generation of the signals that operate the components of the printer 100' to form an object on the platform 112.

Figure 3:
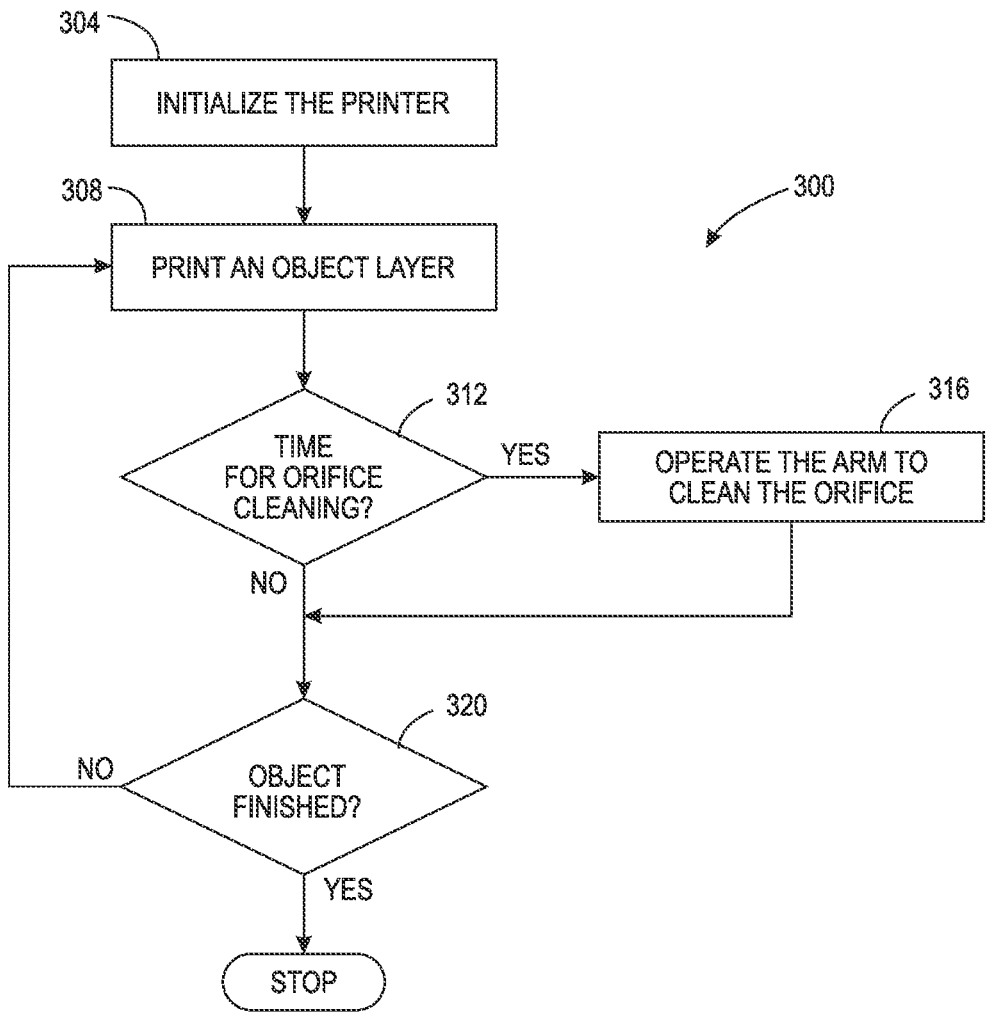
FIG. 3 is a flow diagram of a process for operating the printer of FIG. 2 to clean the nozzle and orifice of the printer.

A process for operating the 3D metal object printer 100' to clean the orifice 110 in the baseplate 114 from time to time is shown in FIG. 3. In the description of the process, statements that the process is performing some task or function refers to a controller or general purpose processor executing programmed instructions stored in non-transitory computer readable storage media operatively connected to the controller or processor to manipulate data or to operate one or more components in the printer to perform the task or function. The controller 148' noted above can be such a controller or processor. Alternatively, the controller can be implemented with more than one processor and associated circuitry and components, each of which is configured to form one or more tasks or functions described herein. Additionally, the steps of the method may be performed in any feasible chronological order, regardless of the order shown in the figures or the order in which the processing is described.

FIG. 3 is a flow diagram for a process 300 that operates the orifice cleaning system 200 to restore the integrity of melted metal drop formation in the printer 100'. The controller 148' is configured to execute programmed instructions stored in a non-transitory memory operatively connected to the controller to operate the application system 200 for this purpose. After the printer is initialized (block 304), the printer is operated to form layers of the object (block 308). After expiration of a predetermined time period or upon detection of a need for orifice cleaning by a printer operator (block 312), the process operates the articulated arm to rub the cleaning tool across the orifice and surrounding baseplate area (block 316). When the orifice and plate area has been cleaned, the process of operating the printer to form the object continues until either the object is finished (block 320) or another orifice cleaning is required (block 312).

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A metal drop ejecting apparatus comprising:
    an ejector head having a nozzle from which melted metal drops are ejected;
    a first planar member toward which the melted metal drops are ejected;
    a second planar member positioned between the ejector head and the first planar member, the second planar member having an orifice through which the ejected melted metal drops pass;
    an orifice cleaning tool having a cleaning head with a face and a handle operatively connected to the cleaning head, the cleaning head also having a pair of beveled surfaces between the handle and the face, the pair of beveled surfaces being positioned on opposite sides of the face, and the face and the pair of beveled surfaces consisting essentially of carbon having a shore value in a range of 60 shore to 90 shore;
    an articulated arm configured to hold the orifice cleaning tool; and
    a controller operatively connected to the articulated arm, the controller being configured to:
        operate the articulated arm to rub the orifice cleaning tool against the second planar member.

2. The apparatus of claim 1 wherein the carbon material consists essentially of graphite.

3. The apparatus of claim 1 wherein the handle consists essentially of the carbon material.

4. The apparatus of claim 1 wherein the handle consists essentially of a material different than the carbon material.

5. An orifice cleaning tool configured for use in a 3D metal object printer, the orifice cleaning tool comprising:

a cleaning head having a face and a pair of beveled surfaces positioned on opposite sides of the face, the face and the pair of beveled surfaces consisting essentially of carbon material having a shore value in a range of 60 shore to 90 shore; and a handle operatively connected to the cleaning head.

6. The tool of claim 5 wherein the carbon material consists essentially of graphite.

7. The tool of claim 5 wherein the handle consists essentially of the carbon material.

8. The tool of claim 5 wherein the handle consists essentially of a material different than the carbon material.

\* \* \* \* \*